United States Patent
Suh et al.

(10) Patent No.: US 7,889,699 B2
(45) Date of Patent: Feb. 15, 2011

(54) METHOD FOR SELECTING SERVING NODE IN MULTI-HOP WIRELESS MOBILE COMMUNICATION SYSTEM

(75) Inventors: Kyung-Joo Suh, Suwon-si (KR); Ki-Young Han, Yongin-si (KR); Dong-Ho Cho, Seoul (KR); Jong-Wuk Son, Gyeongsangbuk-do (KR); Ki-Ho Lee, Daejeon (KR); Chi-Sung Bae, Andong-si (KR); Soo-Yong Jeon, Daejeon (KR); Soon-Young Yoon, Seoul (KR); Young-Hoon Kwon, Seongnam-si (KR); Jae-Hee Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 799 days.

(21) Appl. No.: 11/594,483

(22) Filed: Nov. 7, 2006

(65) Prior Publication Data

US 2007/0104127 A1    May 10, 2007

(30) Foreign Application Priority Data

Nov. 7, 2005    (KR) .................. 10-2005-0106196

(51) Int. Cl.
*H04W 4/00*    (2009.01)
(52) U.S. Cl. .................. 370/331; 370/328; 370/341; 370/338
(58) Field of Classification Search .................. 370/331, 370/328, 341, 338
See application file for complete search history.

(56) References Cited

U.S. PATENT DOCUMENTS

| 7,412,207 | B2 | 8/2008 | Poykko |
| 7,489,668 | B2 | 2/2009 | Cho et al. |
| 2002/0009124 | A1* | 1/2002 | Li .............................. 375/130 |
| 2003/0108059 | A1* | 6/2003 | Yew et al. .................. 370/443 |
| 2003/0125067 | A1* | 7/2003 | Takeda et al. ............... 455/522 |
| 2005/0030927 | A1* | 2/2005 | Mucke ........................ 370/336 |
| 2005/0030968 | A1* | 2/2005 | Rich et al. .................. 370/449 |

FOREIGN PATENT DOCUMENTS

| KR | 10-2005-0004297 | 1/2005 |
| KR | 10-2005-0013023 | 2/2005 |

OTHER PUBLICATIONS

Shannon-Claude_Feb. 1998_Proceedings-of-the-IEEE_vol. 86_No. 2.pdf.*
Periyalwar-Shalini_Sep. 29, 2005_WO-2006-034578-A1.pdf.*
Communication in the Presence of Noise.

* cited by examiner

*Primary Examiner*—Charles N Appiah
*Assistant Examiner*—Alexander Yi
(74) *Attorney, Agent, or Firm*—The Farrell Law Firm, LLP (57) ABSTRACT

Provided is a multi-hop wireless mobile communication system where a plurality of nodes exist. To select a serving node to be provided with a service, a Mobile Station (MS) receives relay information provided for serving node selection from at least two nodes and selects a first mode of selecting a node that requires the minimum time for unit data transmission/reception as the serving node or a second mode of selecting a node that can transmit and receive the maximum data per unit time as the serving node, based on the received relay information, in order to select the serving node.

24 Claims, 9 Drawing Sheets

METHOD FOR SELECTING SERVING NODE IN MULTI-HOP WIRELESS MOBILE COMMUNICATION SYSTEM

PRIORITY

This application claims priority under 35 U.S.C. §119 to an application filed in the Korean Intellectual Property Office on Nov. 7, 2005 and assigned Serial No. 2005-106196, the contents of which are incorporated herein by reference.

BACKGROUND OF THE INVENTION

1. Field of the Invention

The present invention generally relates to a wireless mobile communication system, and in particular, to a system and method in which a Mobile Station (MS) selects a serving node in a multi-hop wireless mobile communication system using a multi-hop method.

2. Description of the Related Art

Generally, the operation in which an MS selects a Base Transceiver Station (BTS) to which a communication link for transmitting and receiving a signal is to be connected in a multi-hop wireless mobile communication system is referred to as a serving node selection operation. The serving node selection operation occurs during a cell selection operation and a handover operation. In the cell selection operation, the MS selects a cell (i.e., a BTS) to which the communication link is to be connected when the MS is powered on or when a previously disconnected MS re-enters a service coverage area. In the handover operation, the MS moves from its current serving BTS to a new BTS, i.e., a target BTS.

When the MS performs the cell selection operation and the handover operation in a general wireless mobile communication system, the MS uses the reception quality, e.g., an energy-to-noise ratio ($E_c/I_0$) value, of a reference signal, e.g., a pilot signal received by the MS in a cell. The MS measures average $E_c/I_0$ values of pilot signals received from a plurality of BTSs and selects a BTS that transmits a pilot signal corresponding to the maximum average $E_c/I_0$ value as its serving node.

In the field of a $4^{th}$-Generation (4G) communication system as a next generation communication system, extensive research has been actively is being conducted to provide multiple services having high transmission speeds and various Quality of Service (QoS). One of the techniques for meeting the performance requirements of the 4G communication system is a multi-hop method.

The multi-hop method not only increases a data transmission rate with low cost but also extends a service coverage area using a relay node. In a general wireless mobile communication system, all MSs are directly connected with a BTS to be provided with a service from the BTS. However, in the multi-hop wireless mobile communication system, a relay node for relaying a signal is additionally included and thus the MS is provided with a service from the BTS or a multi-hop relay node connected with the BTS through a multi-hop node.

When the MS is provided with a service by being connected to the multi-hop relay node, the MS receives a signal transmitted from the BTS through the multi-hop relay node. A delay may occur in the services provided to the MS due to overhead resulting from the relay operation. For example, if the MS receives a signal transmitted from the BTS through two hop nodes, i.e., a first multi-hop relay node and a second multi-hop relay node, in the multi-hop wireless mobile communication system, a service delay occurs due to signal relay operations between the BTS, the first multi-hop relay node, and the second multi-hop relay node when compared to when the MS receives a signal directly from the BTS.

Since the serving node selection operation in the multi-hop wireless mobile communication system has an important influence upon QoS, it is a core part of the multi-hop wireless mobile communication system. There emerges a need for a serving node selection method for a multi-hop wireless mobile communication system, which minimizes a service delay and relay overhead.

SUMMARY OF THE INVENTION

It is, therefore, an object of the present invention to provide a method for selecting a serving node during cell selection of a Mobile Station (MS) in a multi-hop wireless mobile communication system.

It is another object of the present invention to provide a method for selecting a serving node during handover of an MS in a multi-hop wireless mobile communication system.

According to one aspect of the present invention, there is provided a method for selecting a serving node by a Mobile Station (MS) in order for the MS to be provided with a service in a multi-hop wireless mobile communication system where a plurality of nodes exist. The method includes receiving relay information provided for serving node selection from at least two nodes and selecting a first mode of selecting a node that requires a minimum time for unit data transmission/reception as the serving node or a second mode of selecting a node that can transmit and receive a maximum data per unit time as the serving node, based on the received relay information, in order to select the serving node.

According to another aspect of the present invention, there is provided a method for transmitting a signal by a node for serving node selection of a Mobile Station (MS) in a multi-hop wireless mobile communication system where a plurality of nodes exist. The method includes, if the node is a base station that is connected with the MS through one hop, transmitting relay information directly to the MS, and if the node is a relay node that relays a signal of the MS, determining a channel quality of a link connected with an upper node and transmitting the relay information including the determined channel quality to the MS.

According to another aspect of the present invention, there is provided a method for selecting a serving node in a multi-hop wireless mobile communication system where a base station, a Mobile Station (MS), and a relay node for relaying a signal of the MS exist. In the method, the base station transmits a pilot signal to the MS and the relay node, the relay node measures a channel quality with the base station using the pilot signal, the relay node transmits a pilot signal of the relay node together with the measured channel quality to the MS, and the MS selects a node capable of transmitting and receiving a maximum data per unit time or transmitting and receiving unit data for a minimum time using information received from the base station and the relay node.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness.

The present invention provides a method for selecting a serving node by an MS based on relay overhead in a multi-hop wireless mobile communication system.

A method for selecting a serving node by an MS based on a data transmission rate in a multi-hop wireless mobile communication system having a fixed time slot will be described. Also, a method for selecting a serving node by an MS based on the time required for data transmission in a multi-hop wireless mobile communication system having a variable time slot will be described. The serving node may be a Base Transceiver Station (BTS) for performing direct communication with the MS or a relay node (which will be referred to as an 'MH-BTS') for relaying a signal of the BTS.

Figure 1:
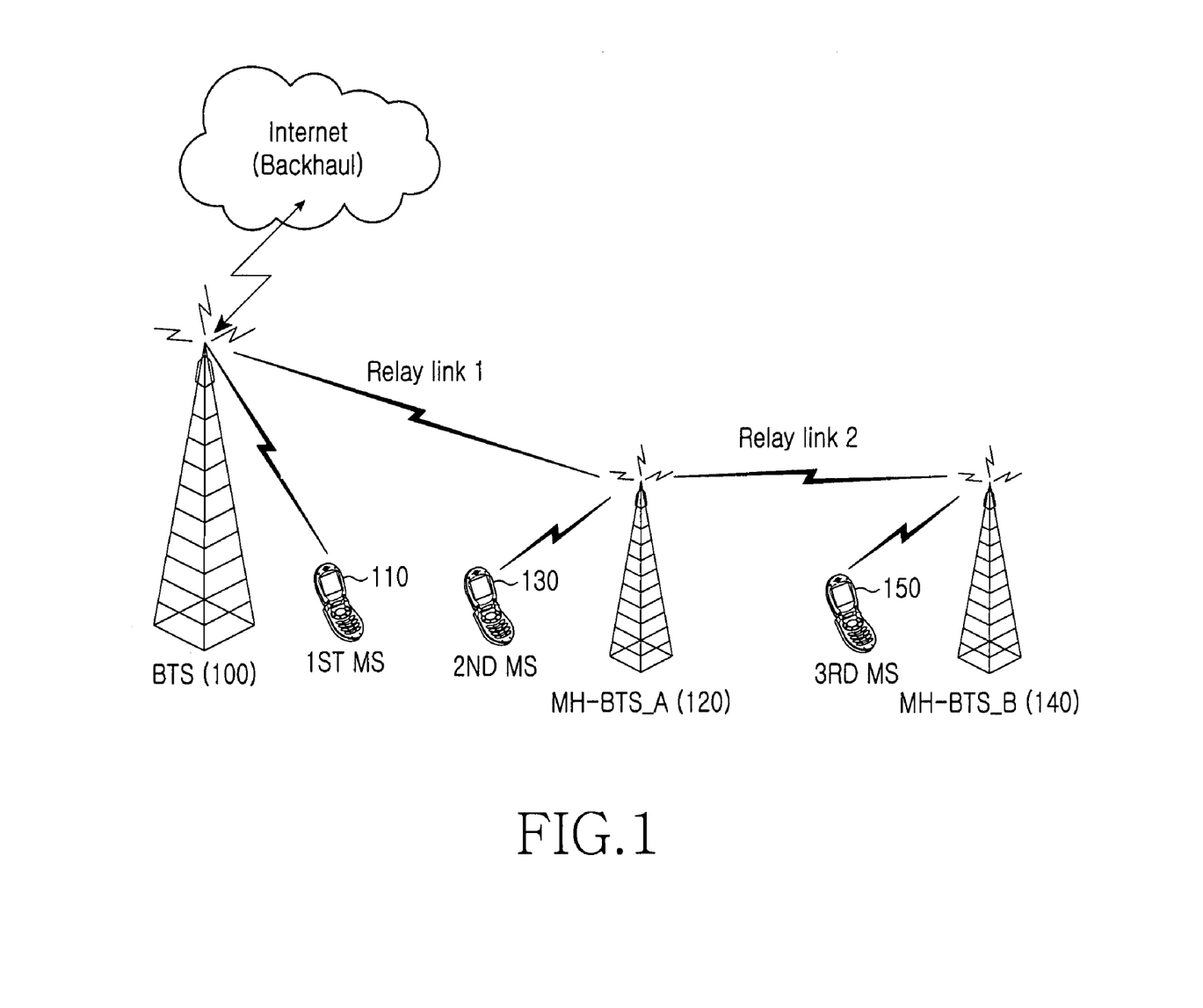
FIG. 1 illustrates the structure of a multi-hop wireless mobile communication system.

FIG. 1 illustrates the structure of a multi-hop wireless mobile communication system.

Referring to FIG. 1, in the multi-hop wireless mobile communication system, there exists a BTS 100, a first MS 110 and an MH-BTS_A 120 that performs direct communication with the BTS 100 through 1 hop, a second MS 130 that performs relay communication with the BTS 100 through the MH-BTS_A 120, an MH-BTS_B 140 that is connected to the BTS 100 through 2 hops, and a third MS 150 that performs relay communication with the BTS 100 through the MH-BTS_B 140.

Communication among the BTS 100, the MH-BTS_A 120, the MH-BTS_B 140, the first MS 110, the second MS 130, and the third MS 150, may be performed using Time Division Duplexing (TDD), or Frequency Division Duplexing (FDD), or a combination thereof.

The second MS 130 and the third MS 150 are provided with a service by being connected to the MH-BTS_A 120 and the MH-BTS_B 140, respectively. Since the first MS 110 is provided with a service through the MH-BTS_A 120 instead of directly from the BTS 100, the service delay of the second MS 130 is inevitable. Moreover, since the third MS 150 is connected with the BTS 100 through 3 hops, it may experience longer service delay than the second MS 130. Thus, the MS needs a method for selecting the optimal serving node by taking into account overhead resulting from relay. Hereinafter, the method for selecting a serving node by the MS will be explained in more detail.

Figure 2:
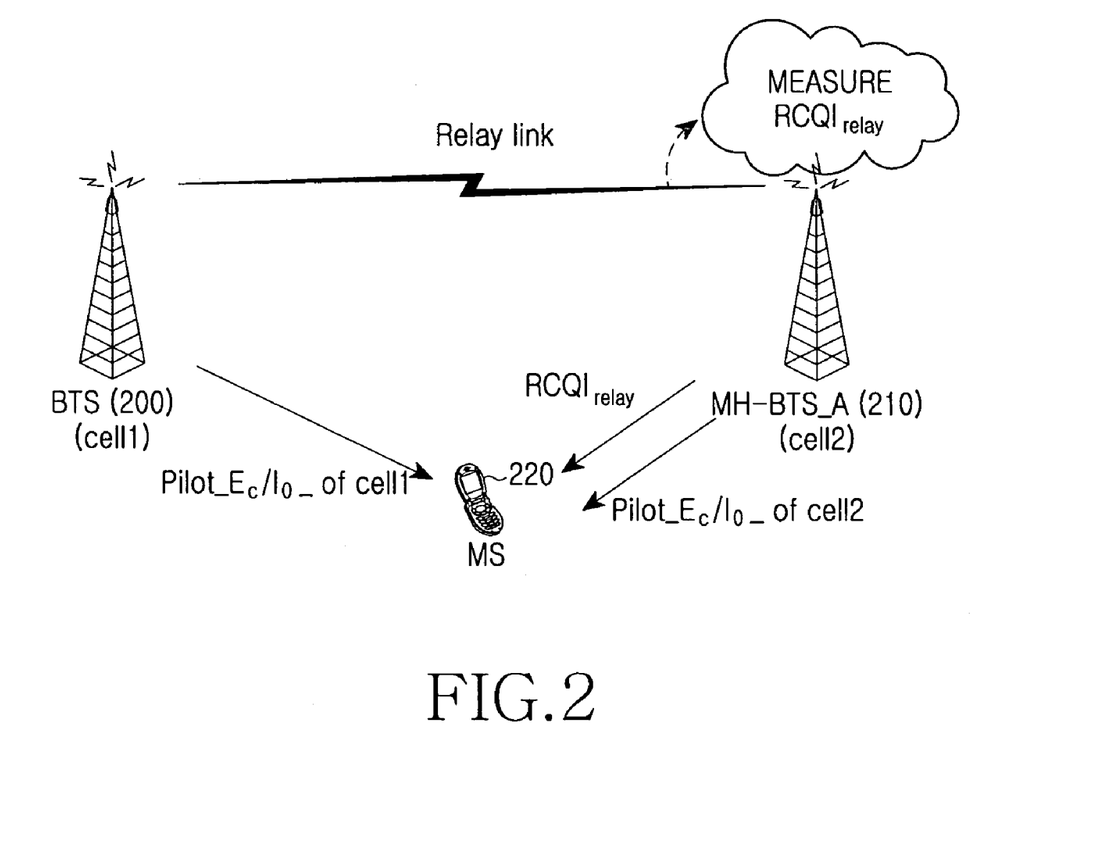
FIG. 2 illustrates the structure of a multi-hop wireless mobile communication system for explaining the basic operation principle of the present invention.

FIG. 2 illustrates the structure of a multi-hop wireless mobile communication system for explaining the basic operation principle of the present invention.

Referring to FIG. 2, a MS 220 selects one of a BTS 200 and an MH-BTS_A 210 as a serving node. If the multi-hop wireless mobile communication system uses a time slot of a fixed length, the MS 220 defines an Estimated Throughput (ETH) to calculate a data transmission cost. The ETH indicates the amount of data that can be transmitted during data transmission/reception. A smaller ETH means that data transmission can be performed at a higher transmission rate. In contrast, if the multi-hop wireless mobile communication system uses a time slot of a variable length, the MS 220 defines an Estimated Service Time (EST). The EST indicates the time required for data transmission/reception. A smaller EST means that data transmission/reception can be performed at a higher transmission rate.

The MS 220 measures the strength ($E_c/I_0$) of a pilot signal from each of the BTS 200 and the MH-BTS_A 210 to calculate an ETH and an EST with respect to a link of each of the BTS 200 and the MH-BTS_A 210 and receives a Relay Channel Quality Indicator ($RCQI_{relay}$) from the MH-BTS_A 210. The $RCQI_{relay}$ indicates the state of a relay link channel between the BTS 200 and the MH-BTS_A 210. The MH-BTS_A 210 measures a Signal-to-Interference and Noise Ratio (SINR) of the relay link and predicts a data transmission rate available in the relay link in order to determine the $RCQI_{relay}$ and transmits the $RCQI_{relay}$ to the MS 220.

The MS 220 measures the strength of a pilot signal from the BTS 200, i.e., pilot_$E_c/I_0$ of Cell 1, and the strength of a pilot signal from the MH-BTS_A 210, i.e., pilot_$E_c/I_0$ of Cell 2, and calculates an EST or an ETH with respect to each of Cell 1 and Cell 2 based on the $RCQI_{relay}$ received from the MH-BTS_A 210. The EST and the ETH may be calculated using the Shannon's law according to Equation (1):

$$\text{Maximum transmission rate} = \text{bandwidth} \times \log_2(1+\text{SINR}) \quad (1)$$

A method for selecting a service node using an ETH in a multi-hop wireless mobile communication system having a fixed time slot according to a first embodiment of the present invention will now be described.

The multi-hop wireless mobile communication system having the fixed time slot means that the multi-hop wireless mobile communication system in which the length of a time slot of relay and access is fixed. The relay refers to a link between the BTS and the MH-BTS and the access refers to a link between the BTS and the MS or the MH-BTS and the MS.

The MS 220 calculates an ETH for each of the BTS 200 corresponding to Cell 1 and the MH-BTS_A 210 corresponding to Cell 2 according to Equations (2) and Equation (3):

$$ETH_{cell1} = BW_{cell1} \times \log_2(1+SINR_{cell1}) \times (t_1+t_2) \quad (2)$$

$$ETH_{cell2} = \min((BW_{relay1} \times \text{Rate}_{relay1} \times t_1), (BW_{cell2} \times \log_2(1+SINR_{cell2}) \times t_2)) \quad (3),$$

where $t_1$ indicates the length of a time slot of a relay link between the BTS 200 and the MH-BTS_A 210, $t_2$ indicates the length of a time slot of an access link between the BTS 200 and the MS 220 or the MH-BTS_A 210 and the MS 220, $BW_{relay1}$ indicates a bandwidth assigned for the relay link between the BTS 200 and the MH-BTS_A 210, and $Rate_{relay1}$ indicates a transmission rate per unit bandwidth (bps/Hz) at which a signal can be transmitted through the relay link 1. The MS 220 can know $Rate_{relay1}$ through the $RCQI_{relay}$ received from the MH-BTS_A 210. To calculate $Rate_{relay1}$ from the $RCQI_{relay}$, Equation (1) or a lookup table may be used. If bandwidths are different in Equations (2) and (3), the BTS 200 or the MH-BTS_A 210 has to transmit bandwidth information to the MS 220. The SINR can be predicted from the measured length of a pilot signal.

The MS 220 selects a node having the maximum ETH as a serving node according to Equation (4):

$$\max\{ETH_{cell1}, ETH_{cell2}\} \quad (4)$$

In other words, the MS 220 selects one of the BTS 200 and the MH-BTS_A 210, which is capable of transmitting and receiving more data, as a serving node.

In the following description, a method for selecting a serving node by an MS using an ETS in a multi-hop wireless mobile communication system having a variable time slot according to a second embodiment of the present invention will be described.

The multi-hop wireless mobile communication system having the variable time slot refers to the multi-hop wireless mobile communication system in which the length of a time slot of relay and access temporally varies.

The MS 220 calculates an ETS for each of the BTS 200 corresponding to Cell 1 and the MH-BTS_A 210 corresponding to Cell 2 according to Equation (5) and Equation (6):

$$EST_{cell1} = \frac{1}{BW_{cell1} \times \log_2(1 + SINR_{cell1})} \quad (5)$$

$$EST_{cell2} = \frac{1}{BW_{cell2} \times \log_2(1 + SINR_{cell2})} + \frac{1}{BW_{relay1} \times Rate_{relay1}} \quad (6)$$

The MS 220 selects a node having the minimum EST as a serving node according to Equation (7):

$$\min\{EST_{cell1}, EST_{cell2}\} \quad (7)$$

The MS 220 selects one of the BTS 200 and the MH-BTS_A 210 which transmits and receives data for the minimum time as a serving node.

Although it is assumed that the MS 220 is provided with a service through 2 hops at most in FIG. 2, the MS 220 may be provided with 3 or more hops in an actual system implementation. In this case, the MS 220 has to calculate an EST or an ETH based on additional information as well as the strength of a pilot signal and RCQI information.

Figure 3:
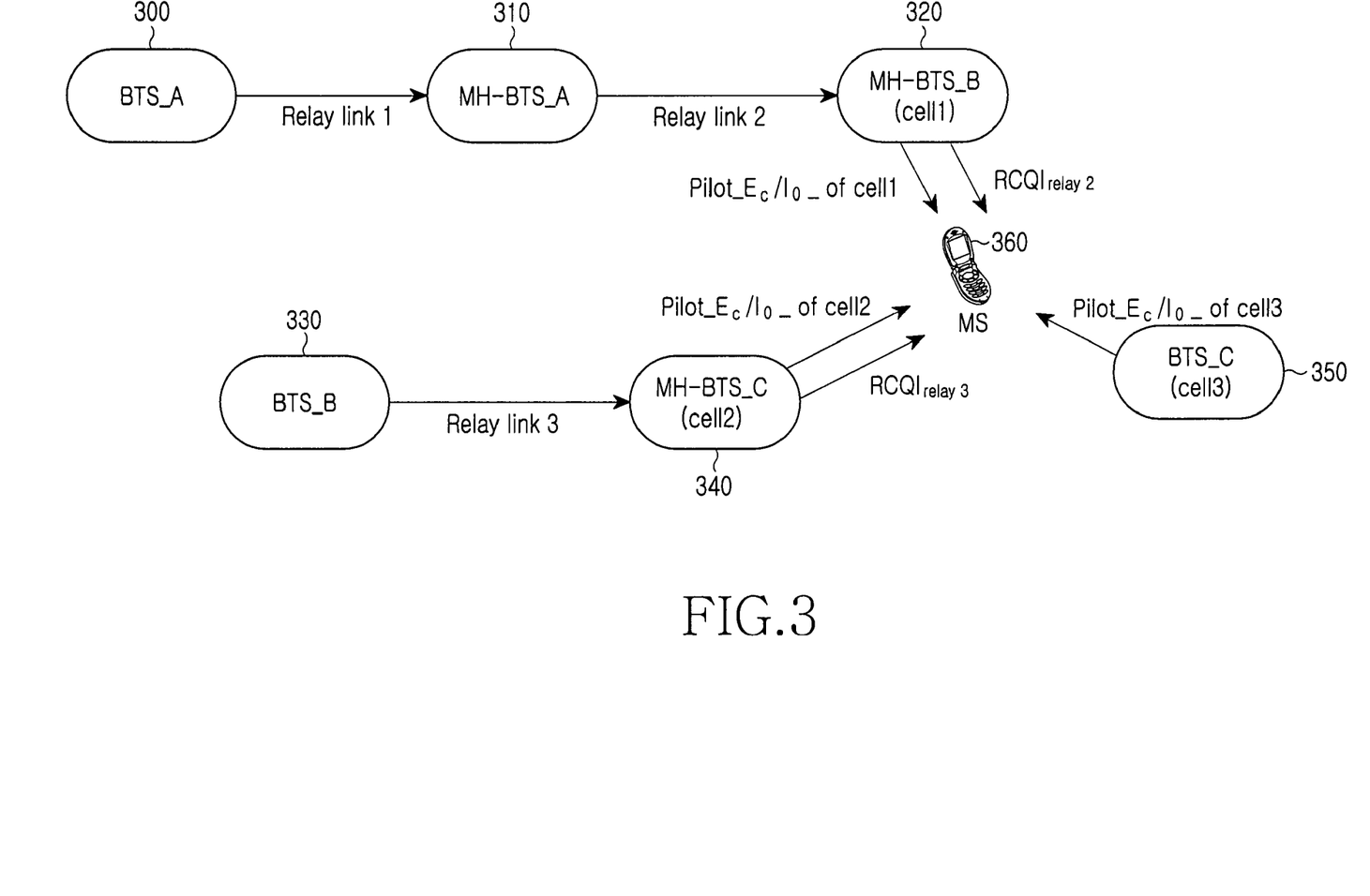
FIG. 3 illustrates an example in which a Mobile Station (MS) is provided with a service through 3 hops in a multi-hop wireless mobile communication system according to of the present invention.

FIG. 3 illustrates an example in which an MS is provided with a service through 3 hops in a multi-hop wireless mobile communication system according to the present invention.

Referring to FIG. 3, to be provided with a service through a 3-hop link among a BTS_A 300, an MH-BTS_A 310, and an MH-BTS_B 320, through a 2-hop link between a BTS_B 330 and an MH-BTS_C 340, or directly from a BTS_C 350, an MS 360 has to select a specific serving node by calculating an ETH or an EST for each link.

However, the MS 360 cannot know the state of a channel, i.e., a relay link 1, between the BTS_A 300 and the MH-BTS_A 310. As a result, the MS 360 cannot calculate an EST or an ETH described above with reference to FIG. 2. Therefore, a solution for calculating an EST or an ETH for a case where the MS 360 is connected through multi-hops including at least 3 hops will be described below.

Figure 4:
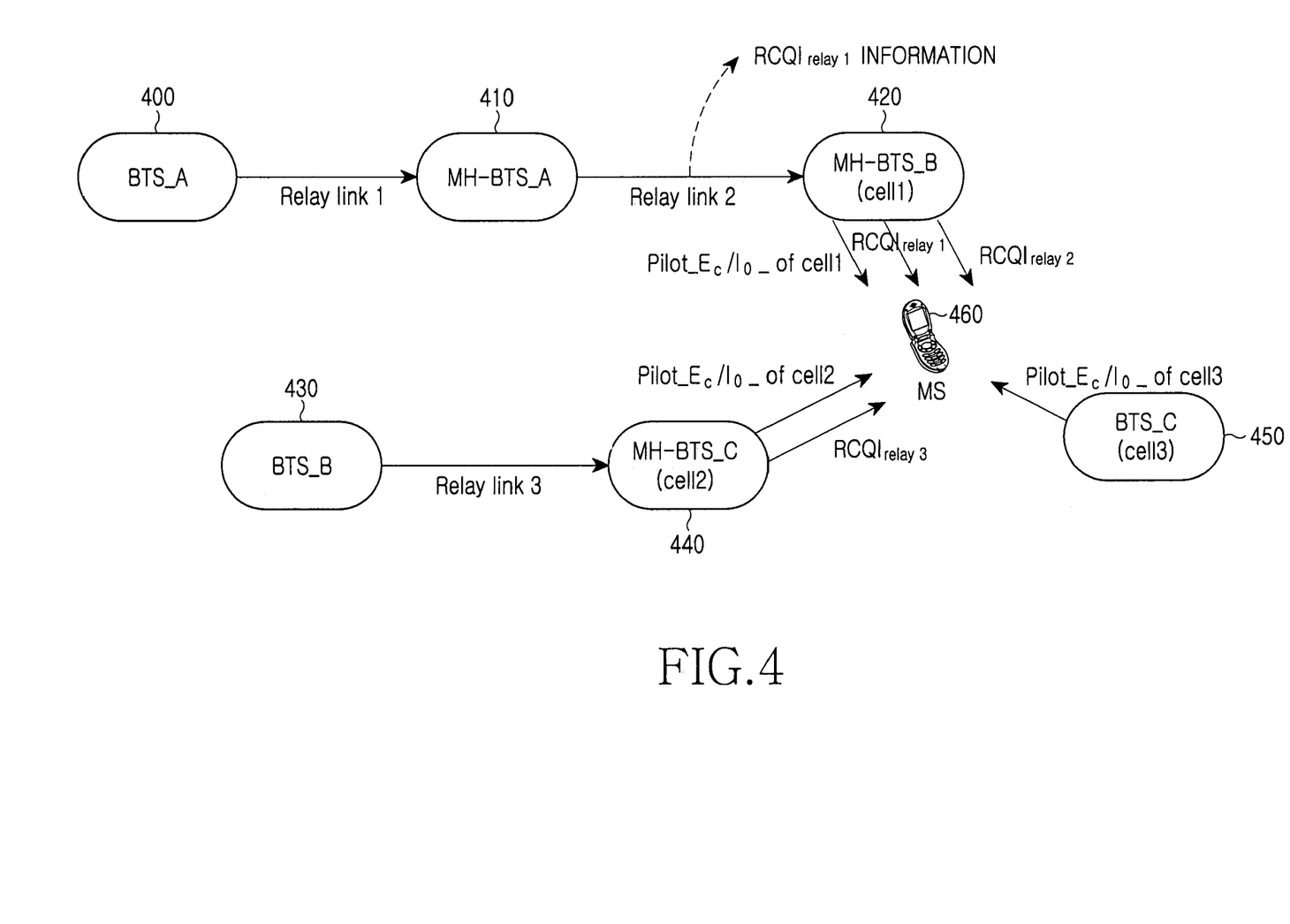
FIG. 4 is a diagram of a method for selecting a service node for a case where an MS is connected through at least 3 hops in a multi-hop wireless mobile communication system according to the present invention.

FIG. 4 is a diagram of a method for selecting a service node for a case where an MS is connected through at least 3 hops in a multi-hop wireless mobile communication system according to the present invention.

Referring to FIG. 4, when an MS 460 is provided with a service from a BTS_A 400, an MH-BTS_A 410, and an MH-BTS_B 420 through 3 hops, the MS 460 additionally requires $RCQI_{relay1}$ that is a relay channel quality indicator between the BTS 400 and the MH-BTS_A 410 as well as the strength of a pilot signal from the MH-BTS_B 420, i.e., Pilot $E_c/I_0$ of Cell 1, and $RCQI_{relay2}$. The MH-BTS_B 420 may receive $RCQI_{relay1}$ that is broadcast by the MH-BTS_A 410 for transmission to the MS 460 or may directly receive $RCQI_{relay1}$ that is broadcast by the MH-BTS_A 410 through a relay link 2 for transmission to the MS 460. If different bandwidths are allocated to the relay link 1 and the relay link 2, the MH-BTS_A 410 has to transmit information about a bandwidth allocated to the relay link 1, i.e., $BW_{relay1}$, to the MH-BTS_B 420 through the relay link 2. The MH-BTS_B 420 has to transmit RCQI and BW information to the MS 460.

The MS 460 measures the strength of a pilot signal received from the MH-BTS_B 420 and receives $RCQI_{relay1}$ and $RCQI_{relay2}$ to calculate an EST and an ETH according to Equation (8) and Equation (9):

$$EST_{cell1} = \frac{1}{BW_{cell1} \times \log_2(1 + SINR_{cell1})} + \frac{1}{BW_{relay1} \times Rate_{relay1}} + \frac{1}{BW_{relay2} \times Rate_{relay2}} \quad (8)$$

$$EST_{cell1} = \min\begin{pmatrix} BW_{relay1} \times Rate_{relay1} \times t_1, \\ BW_{relay2} \times Rate_{relay2} \times t_2, BW_{cell1} \times \\ \log_2(1 + SINR_{cell1}) \times t_3 \end{pmatrix} \quad (9)$$

where $t_1$ indicates the length of a time slot of the relay link 1, $t_2$ indicates the length of a time slot of the relay link 2, and $t_3$ indicates the length of a time slot of an access link. If the number of hops increases in the method described above, the number of relay links connected with upper nodes also increases. As a result, MH-BTSs have to transmit more additional information. A method for selecting a serving node using a relay order to reduce signaling overhead will be described below.

Figure 5:
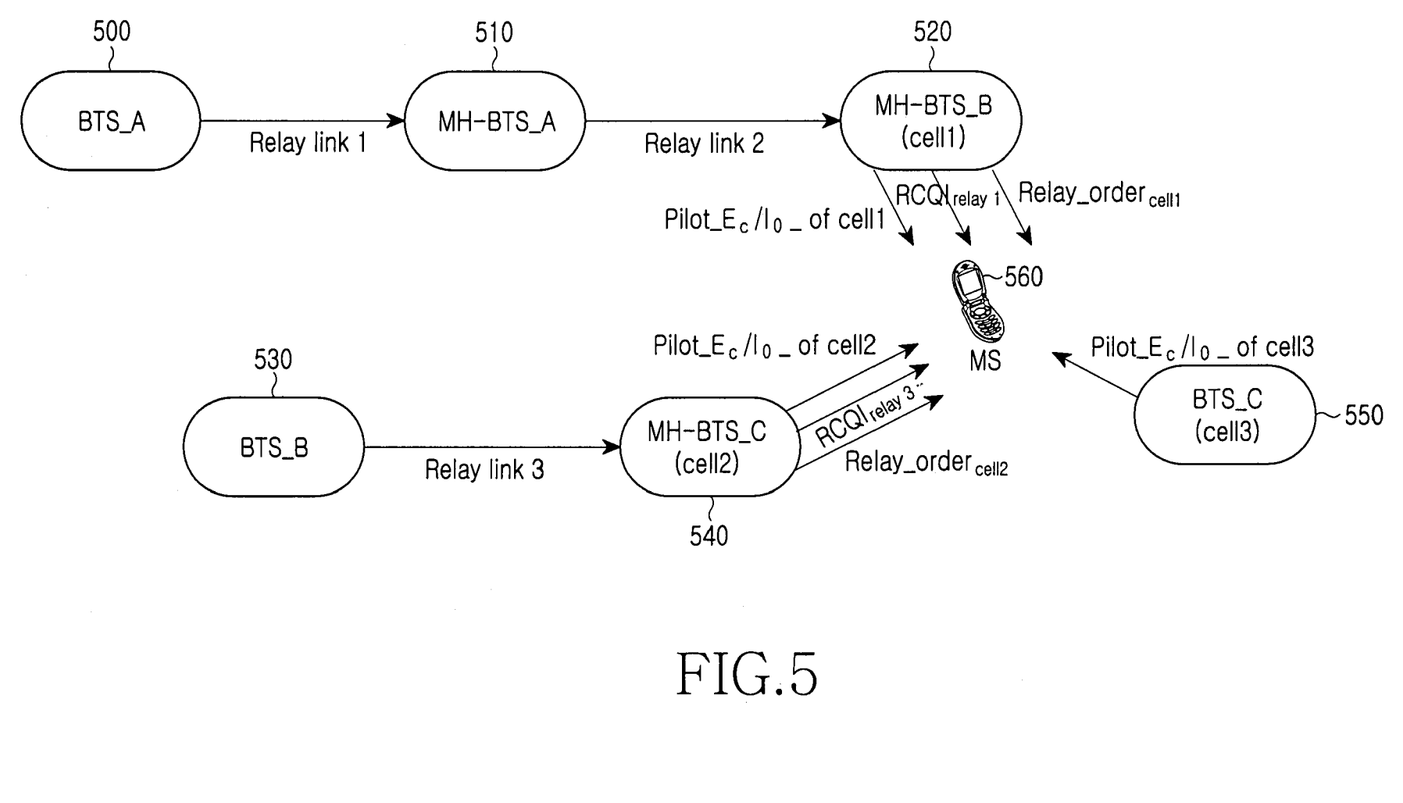
FIG. 5 is a diagram of a method for selecting a service node using a relay order for a case where an MS is connected through at least 3 hops in a multi-hop wireless mobile communication system according to the present invention.

FIG. 5 is a diagram of view for explaining a method for selecting a service node using a relay order for a case where an MS is connected through at least 3 hops in a multi-hop wireless mobile communication system according to the present invention.

Referring to FIG. 5, each of an MH-BTS_A 510, an MH-BTS_B 520, and an MH-BTS_C 540 informs an MS 560 of relay order information indicating how many relay nodes exist before itself. The MS 560 calculates an EST or an ETH based on the relay order information, the RCQI, and the bandwidth according to Equation (10):

$$EST_{cell1} = \frac{1}{BW_{cell1} \times \log_2(1 + SINR_{cell1})} + \qquad (10)$$

$$\frac{relay\_order_{cell1}}{BW_{relay2} \times Rate_{relay2}}$$

$$ETH_{cell1} = \min\left(\frac{BW_{relay2} \times Rate_{relay2} \times t_2}{relay\_order_{cell1}}, BW_{cell1} \times \log_2(1 + SINR_{cell1}) \times t_3\right),$$

where $t_2$ indicates the length of a time slot of the relay link 2, $t_3$ indicates the length of a time slot of the access link, $Rate_{relay2}$ indicates a transmission rate per unit bandwidth (bps/Hz) at which a signal can be transmitted through the relay link 2, and $relay\_order_{cell1}$ indicates how many relay nodes exist before the MH-BTS_B 520. For example, if the BTS_A 500, which is a top node, sets its relay order to '0' and broadcasts '0' as its relay order information, the MH-BTS_A 510 receives the relay order information, increases the relay order by 1, and broadcasts '1' as its relay order information. Then the MH-BTS_B 520 receives the relay order information, increases the relay order by 1, and broadcasts '2' as its relay order information. The MH-BTS_B 520 informs '2' of the MS 560 as its relay order ($relay\_order_{cell1}$) in FIG. 5.

The MS 560 calculates an EST or an ETH for each cell, i.e., each of the MH-BTS_B 520, the MH-BTS_C 540, and the BTS_C 550, to select one of them, which has the minimum EST or the maximum ETH, as a serving node, according to Equation (11):

$$\min\{EST_{cell1}, EST_{cell2}, EST_{cell3}\}\max\{ETH_{cell1}, ETH_{cell2}, ETH_{cell3}\} \qquad (11)$$

Figure 6:
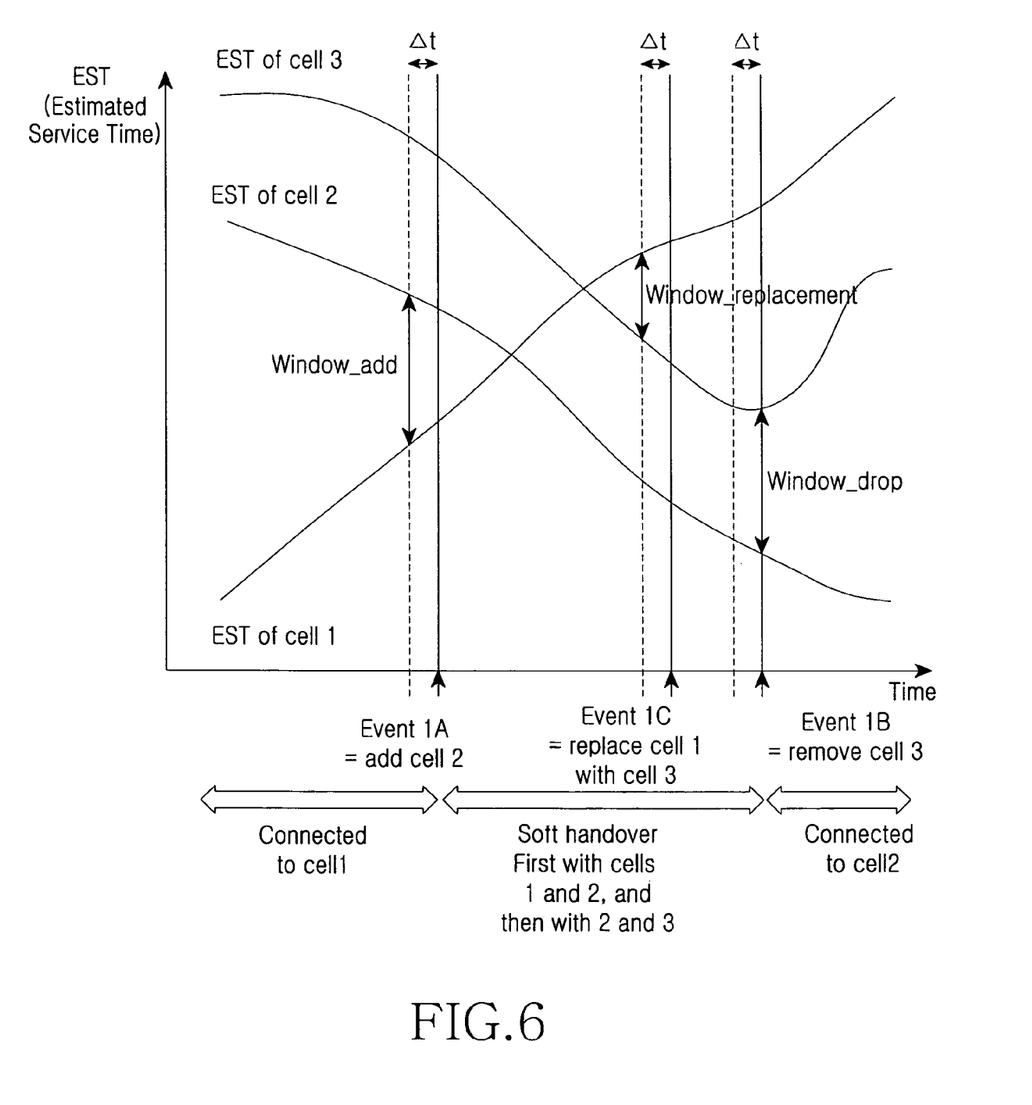
FIG. 6 is a graph illustrating a serving node selection operation considering an Estimated Service Time (EST) during handover of an MS in a multi-hop wireless mobile communication system according to the present invention.

FIG. 6 is a graph illustrating a serving node selection operation considering an EST during handover of an MS in a multi-hop wireless mobile communication system according to the present invention.

Referring to FIG. 6, it is assumed that an MS, which is initially in a cell 1, moves to an overlapping area between a cell 2 and a cell 3, and then moves to the cell 2.

If an EST of the cell 2 is less than an EST of the cell 1+Window_add for Δt, the MS adds the cell 2 to an active set and performs a soft handover to be provided with a service in the cell 1 and the cell 2. Window_add indicates a value that is preset to add a specific cell to the active set.

If the EST of the cell 1 becomes greater than $EST_{cell3}$+Window_replacement as the MS moves from the cell 1 to the cell 3, the cell 1 is removed from the active set and the cell 3 is added to the active set. The MS performs a soft handover to be provided with a service in the cell 2 and the cell 3. The Window_replacement indicates a value that is preset to replace a specific cell with another cell in the active set.

The MS compares the EST of the cell 3 with $EST_{cell2}$+Window_drop and thus if the EST of the cell 3 is greater than $EST_{cell2}$+Window_drop, the MS disconnects a communication link with the cell 3 and is provided with a service only from the cell 2. Window_drop indicates a vale that is preset to remove a specific cell from the active set.

Figure 7:
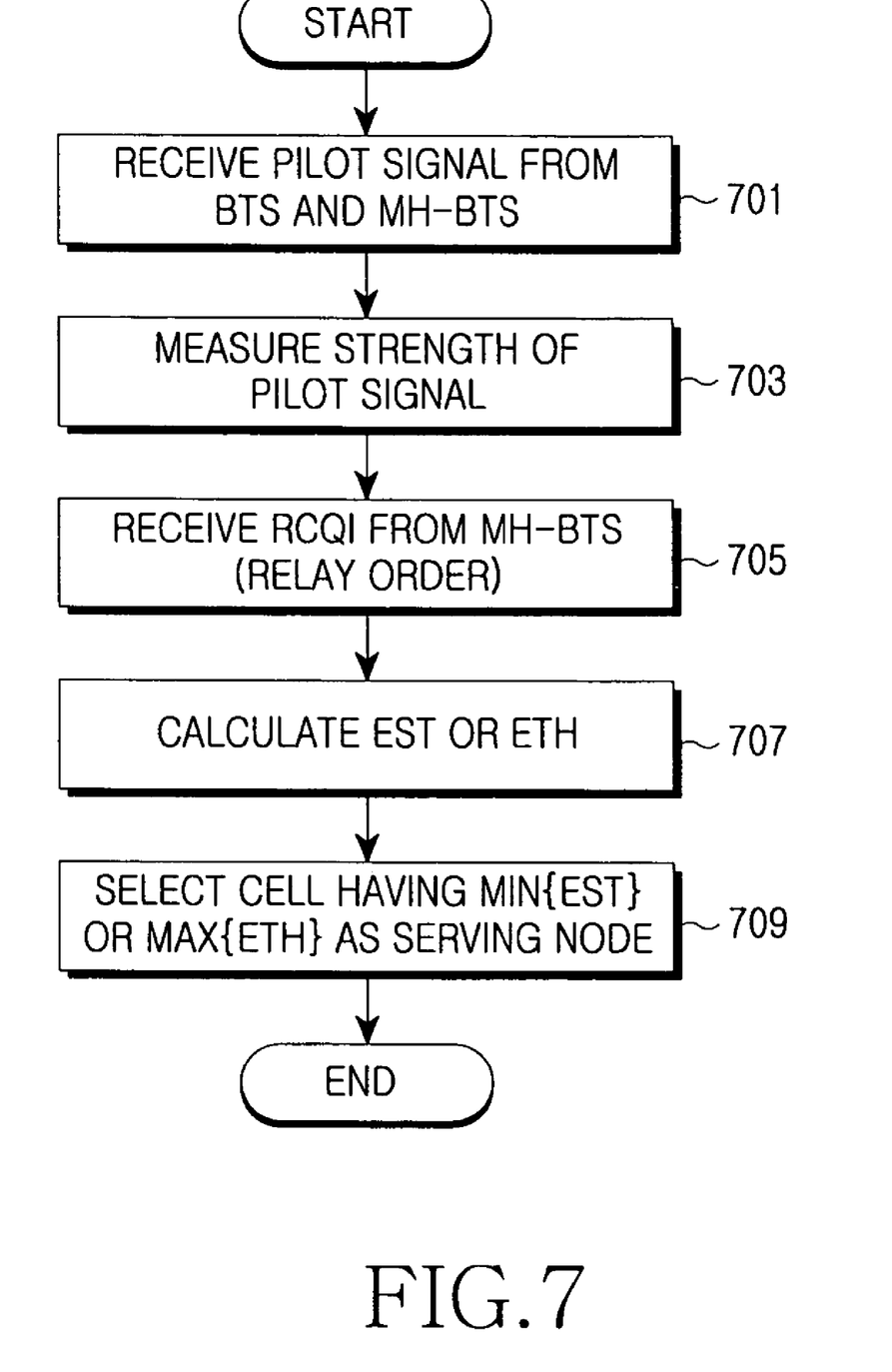
FIG. 7 is a flowchart illustrating a process in which an MS selects a serving node in a multi-hop wireless mobile communication system according to the present invention.

FIG. 7 is a flowchart illustrating a process in which an MS selects a serving node in a multi-hop wireless mobile communication system according to the present invention.

Referring to FIG. 7, the MS receives a pilot signal from a BTS and an MH-BTS in step 701. In step 703, the MS measures the strength Pilot_$E_c/I_0$ of a pilot signal from the BTS and the strength Pilot_$E_c/I_0$ of a pilot signal from the MH-BTS in step 703. In step 705, the MS receives RCQI or RCQI and relay order information from the MH-BTS. In step 707, the MS calculates an EST or an ETH for each of the BTS and the MH-BTS. In step 709, the MS selects one of the BTS and the MH-BTS, which has the minimum EST or the maximum ETH, as a serving node.

Figure 8:
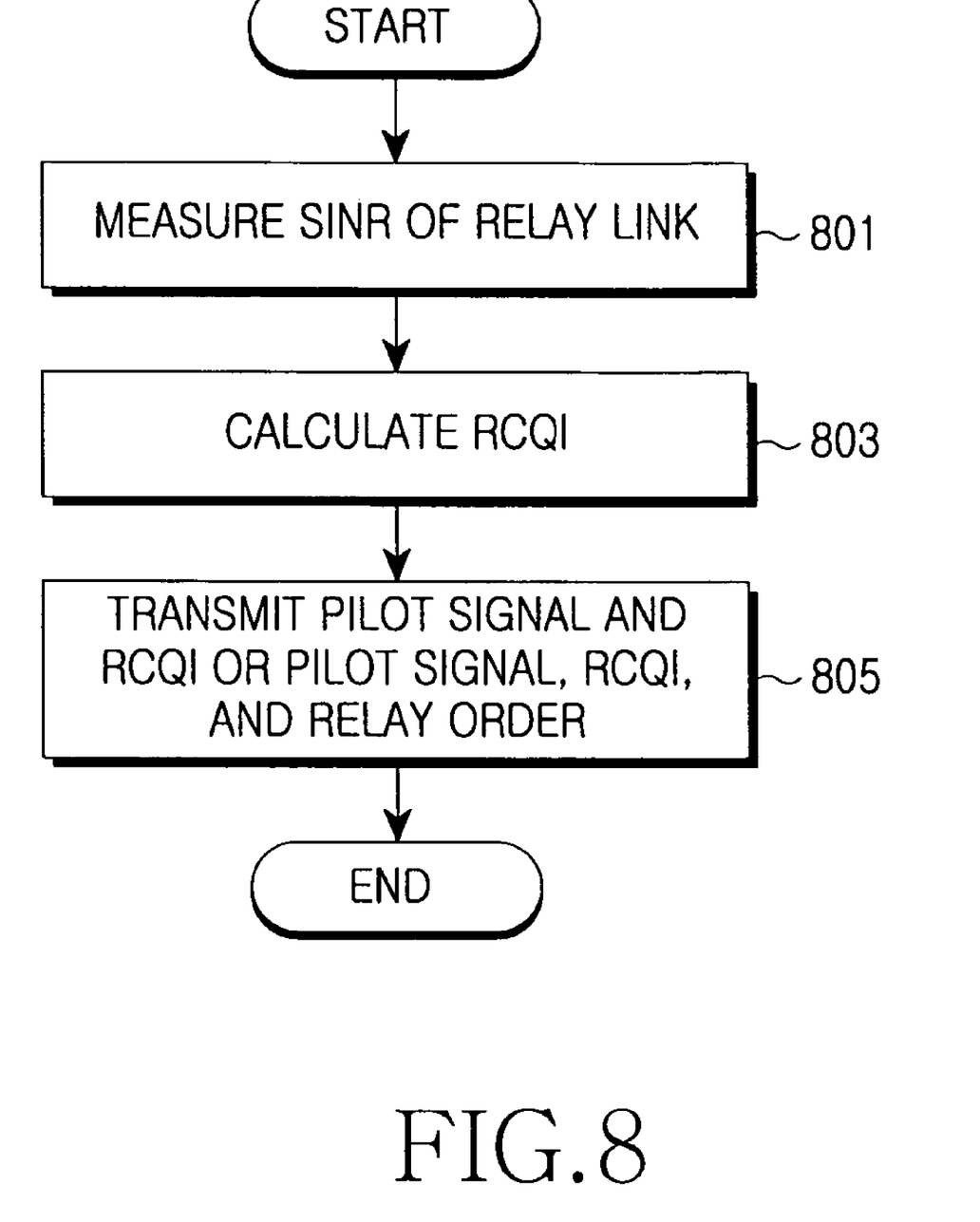
FIG. 8 is a flowchart illustrating a process in which an MH-BTS operates in relation to the MS's serving node selection process in a multi-hop wireless mobile communication system according to the present invention.

FIG. 8 is a flowchart illustrating a process in which an MH-BTS operates in relation to the MS's serving node selection process in a multi-hop wireless mobile communication system according to the present invention.

Referring to FIG. 8, the MH-BTS measures the SINR of a relay link. In step 803, the MH-BTS calculates RCQI using the measured SINR. In step 805, the MH-BTS transmits a pilot signal and RCQI information or the pilot signal, RCQI information, and relay order information to the MS.

The multi-hop wireless mobile communication system requires overhead for transmitting additional information like RCQI information and relay order information unlike a general cellular communication system. The amount of data required for transmitting the RCQI information is about a 5 bit maximum and additional data of about 2 bits is required for transmitting the relay order information. In other words, data of about 1 byte is added to transmit the RCQI information and the relay order information and data of 2 bytes may be added to further transmit bandwidth information together with the RCQI information and the relay order information.

Since a relay section is connected through a Line Of Sight (LOS) in the multi-hop wireless mobile communication system, the degree of change in a wireless channel state is a trivial matter. If an RCQI is transmitted only when the state of a relay link channel changes, i.e., the RCQI changes, large overhead resulting from transmission of the RCQI does not occur. Since the relay order or the bandwidth allocated to each link is fixed, the overhead can be minimized by increasing a period for transmitting the relay order or bandwidth information.

Figure 9:
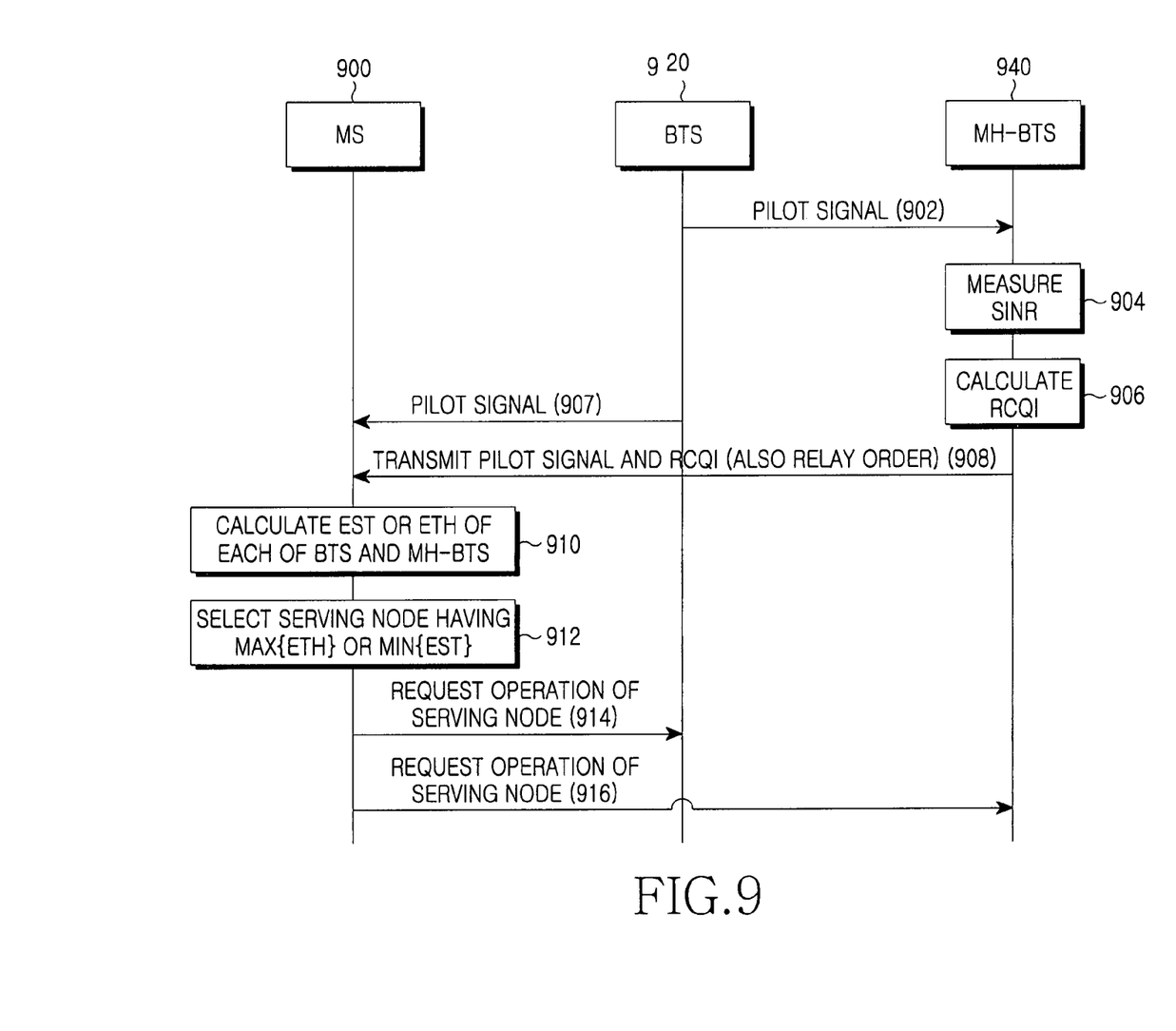
FIG. 9 illustrates a signal flow between nodes for serving node selection in a multi-hop wireless mobile communication system according to the present invention.

FIG. 9 illustrates a signal flow between nodes for serving node selection in a multi-hop wireless mobile communication system according to the present invention.

Referring to FIG. 9, a BTS 920 transmits a pilot signal to an MH-BTS 940 in step 902. The MH-BTS 940 measures an SINR using the received pilot signal in step 904 and calculates an RCQI in step 906. The BTS 920 transmits a pilot signal to an MS 900 in step 907. The MH-BTS 940 periodically transmits a pilot signal and RCQI information to the MS 900 in step 908. Here, the MH-BTS 940 may also transmit relay order information.

The MS 900 calculates an EST or an ETH for each of the BTS 920 and the MH-BTS 940 using the pilot signal and other information received from the BTS 920 and the MH-BTS 940 in step 910. The MS 900 selects one of the BTS 920 and the MH-BTS 940, which has the maximum ETH or the minimum EST, as a serving node in step 912. If the MS 900 selects the BTS 920 as the serving node, it requests the BTS 920 to operate as the serving node in step 914. If the MS 900 selects the MH-BTS 940 as the serving node, it requests the MH-BTS 940 to operate as the serving node in step 916.

As described above, the present invention suggests a new method for selecting a serving node by an MS based on the amount of data that can be transmitted or a data transmission speed in order for an MS to be provided with a service in a multi-hop wireless mobile communication system. Thus, the MS can effectively select the serving node by minimizing overhead resulting from relay when first entering a cell. Moreover, the MS can select a serving node that minimizes overhead resulting from relay when performing a handover, thereby improving the overall data processing performance of the system.

While the invention has been shown and described with reference to preferred embodiments thereof, it will be understood by those skilled in the art that various changes in form and details may be made therein without departing from the spirit and scope of the invention.

What is claimed is:

1. A method for selecting a serving node by a Mobile Station (MS) to provide the MS with a service in a multi-hop wireless mobile communication system where a plurality of nodes exist, the method comprising the steps of:
   receiving from at least two nodes relay information; and
   calculating a time for unit data transmission/reception of each of the at least two nodes using the relay information, and selecting a node that requires a minimum time for the unit data transmission/reception as the serving node, based on the calculated time, when the multi-hop wireless communication system uses a variable time slot,
   wherein if the MS is directly connected with a first node of the at least two nodes and the first node has a base station and a relay node as upper nodes, a time for the unit data transmission/reception of the first node is calculated based on $$EST_{cell1} = \frac{1}{BW_{cell1} \times \log_2(1+SINR_{cell1})} + \frac{1}{BW_{relay1} \times Rate_{relay1}} + \frac{1}{BW_{relay2} \times Rate_{relay2}}$$

where an Estimated Service Time $(EST)_{cell}$ indicates the time for the unit transmission/reception of the first node, $BW_{cell1}$ indicates a bandwidth that is used by the first node, $BW_{relay1}$ indicates a bandwidth allocated to a first relay link between the base station and the relay node, $BW_{relay2}$ indicates a bandwidth allocated to a second relay link between the relay node and the first node, $Rate_{relay1}$ indicates a transmission rate per unit bandwidth (bps/Hz) at which data can be transmitted through the first relay link, $Rate_{relay2}$ indicates a transmission rate per unit bandwidth at which data can be transmitted through the second relay link, $SINR_{cell1}$ indicates a signal-to-interference noise ratio that is determined by measuring a strength of a pilot signal transmitted from the first node.

2. The method of claim 1, wherein the relay information includes at least one of a pilot signal transmitted from each of the at least two nodes, a Relay Channel Quality Indicator (RCQI) indicating relay channel qualities of nodes except for a last node when the MS and one of the at least two nodes is connected through two nodes, bandwidth allocation information provided when the at least two nodes use different bandwidths, and relay order information indicating a relay order of each of the at least two nodes.

3. The method of claim 1, wherein the step of receiving from at least two nodes relay information, comprises:
   if a second node of the at least two nodes is a base station that is directly connected with the MS, receiving the relay information directly from the second node; and
   if the second node is a relay node that relays a signal of the MS, receiving the relay information including a channel quality information between an upper node and the second node from the second node.

4. The method of claim 3, further comprising, if a lower relay node of the second node exists, receiving from the lower relay node the relay information including the channel quality information.

5. A method for selecting a serving node by a Mobile Station (MS) to provide the MS with a service in a multi-hop wireless mobile communication system where a plurality of nodes exist, the method comprising the steps of:
   receiving from at least two nodes relay information; and
   calculating a time for unit data transmission/reception of each of the at least two nodes using the relay information, and selecting a node that requires a minimum time for the unit data transmission/reception as the serving node, based on the calculated time, when the multi-hop wireless communication system uses a variable time slot,
   wherein if the relay information includes relay order information and the MS is directly connected with a first node of the at least two nodes and the first node has base station and a relay node as upper nodes, a time for the unit data transmission/reception of the first node is calculated based on $$EST_{cell1} = \frac{1}{BW_{cell1} \times \log_2(1+SINR_{cell1})} + \frac{relay\_order_{cell1}}{BW_{relay2} \times Rate_{relay2}}$$

where an Estimated Service Time $(EST)_{cell1}$ indicates the time for the unit data transmission/reception of the first node, $BW_{cell1}$ indicates a bandwidth that is used by the first node, $BW_{relay2}$ indicates a bandwidth allocated to a relay link between the relay node and the first node, $SINR_{cell1}$ indicated a signal-to-interference noise ration that is determined by measuring a strength of a pilot signal transmitted from the first node, $Rate_{relay2}$ indicates a transmission rate per unit bandwidth (bps/Hz) at which a signal can be transmitted through the relay link, and $relay\_order_{cell1}$ indicates a relay order of the first node.

6. A method for selecting a serving node in a multi-hop wireless mobile communication system where a base station, a Mobile Station (MS), and a relay node for relaying a signal of the MS exist, the method comprising the steps of:
   transmitting, by the base station, a pilot signal of the base station to the MS and the relay node;
   measuring, by the relay node, a channel quality between the base station and the relay node using the pilot signal of the base station;
   transmitting, by the relay node, a pilot signal of the relay node and information of the measured channel quality to the MS;
   calculating a time for unit data transmission/reception of each of the base station and the relay node using at least one of the pilot signal of the base station, the pilot signal of the relay node and the information of the measured channel quality; and
   selecting a node that requires a minimum time for the unit data transmission/reception as the serving node based on the calculated times, when the multi-hop wireless mobile communication system uses a variable time slot,
   wherein if the MS is directly connected with the relay node and the relay node has the base station and a first node as upper nodes, a time for the unit data transmission/reception of the relay node is calculated based on $$EST_{cell1} = \frac{1}{BW_{cell1} \times \log_2(1+SINR_{cell1})} +$$

-continued $$\frac{1}{BW_{relay1} \times Rate_{relay1}} + \frac{1}{BW_{relay2} \times Rate_{relay2}}$$

where an Estimated Service Time (EST)$_{cell1}$ indicates the time for the unit data transmission/reception of the relay node, BW$_{cell1}$ indicates a bandwidth that is used by the relay node, BW$_{relay1}$ indicates a bandwidth allocated to a first relay link between the base station and the first node, BW$_{relay2}$ indicates a bandwidth allocated to a second relay link between the first node and the relay node, Rate$_{relay1}$ indicates a transmission rate per unit bandwidth (bps/Hz) at which data can be transmitted through the first relay link, Rate$_{relay2}$ indicates a transmission rate per unit bandwidth at which data can be transmitted through the second relay link, and SINR$_{cell1}$ indicates a signal-to-interference noise ratio that is determined by measuring a strength of a pilot signal transmitted from the relay node.

7. The method of claim 6, wherein the base station transmits relay order information indicating it is a top node to the relay node.

8. The method of claim 7, wherein the relay order information is 0.

9. The method of claim 6, wherein the relay node transmits to the MS relay order information indicating it is positioned between the base station and the MS.

10. The method of claim 9, wherein the relay order information is 1.

11. The method of claim 6, wherein if the base station and the relay node use different bandwidths, the base station and the relay node broadcast bandwidth information of the base station and bandwidth information of the relay node to their respective lower nodes.

12. A method for selecting a serving node in a multi-hop wireless mobile communication system where a base station, a Mobile Station (MS), and a relay node for relaying a signal of the MS exist, the method comprising the steps of:
   transmitting, by the base station, a pilot signal of the base station to the MS and the relay node;
   measuring, by the relay node, a channel quality between the base station and the relay node using the pilot signal of the base station;
   transmitting, by the relay node, a pilot signal of the relay node and information of the measured channel quality to the MS;
   calculating a time for unit data transmission/reception of each of the base station and the relay node using at least one of the pilot signal of the base station, the pilot signal of the relay node and the information of the measured channel quality; and
   selecting a node that requires a minimum time for the unit data transmission/reception as the serving node based on the calculated times, when the multi-hop wireless mobile communication system uses a variable time slot,
   wherein if the base station transmits relay order information to the relay node and the MS is directly connected with the relay node and the relay node has the base station and a first node as upper nodes, a time for the unit data transmission/reception of the relay node is calculated based on $$EST_{cell1} = \frac{1}{BW_{cell1} \times \log_2(1 + SINR_{cell1})} + \frac{relay\_order_{cell1}}{BW_{relay2} \times Rate_{relay2}}$$

where an Estimated Service Time (EST)$_{cell1}$ indicates the time for the unit data transmission/reception of the relay node, BW$_{cell1}$ indicates a bandwidth that is used by the relay node, BW$_{relay2}$ indicates a bandwidth allocated to a relay link between the first node and the relay node, SINR$_{cell1}$ indicates a signal-to-interference noise ratio that is determined by measuring a strength of a pilot signal transmitted from the relay node, Rate$_{relay2}$ indicates a transmission rate per unit bandwidth (bps/Hz) at which a signal can be transmitted through the relay link, and relay_order$_{cell1}$ indicates a relay order of the relay node.

13. A method for selecting a serving node by a Mobile Station (MS) to provide the MS with a service in a multi-hop wireless mobile communication system where a plurality of nodes exist, the method comprising the steps of:
   receiving from at least two nodes relay information;
   calculating an amount of data that can be transmitted per unit time of each of the at least two nodes using the relay information; and
   selecting a node that can transmit a maximum amount of data per the unit time as the serving node, based on the calculated amount of data, when the multi-hop wireless mobile communication system uses a fixed time slot,
   wherein if the MS is directly connected with a first node of the at least two nodes and the first node has a base station and a relay node as upper nodes, an amount of data per the unit time of the first node is calculated based on $$ETH_{cell1} = \min(BW_{relay1} \times Rate_{relay1} \times t_1, BW_{relay2} \times Rate_{relay2} \times t_2, BW_{cell1} \times \log_2(1 + SINR_{cell1}) \times t_3)$$

where an Estimated data Throughput (ETH)$_{cell1}$ indicates the amount of data per the unit time of the first node, BW$_{cell1}$ indicates a bandwidth that is used by the first node, BW$_{relay1}$ indicates a bandwidth allocated to a first relay link between the base station and the relay node, BW$_{relay2}$ indicates a bandwidth allocated to a second relay link between the relay node and the first node, Rate$_{relay1}$ indicates a transmission rate per unit bandwidth (bps/Hz) at which data can be transmitted through the first relay link, Rate$_{relay2}$ indicates a transmission rate per unit bandwidth at which data can be transmitted through the second relay link, SINR$_{cell1}$ indicates a signal-to-interference noise ratio that is determined by measuring a strength of a pilot signal transmitted from the first node, $t_1$ indicates a length of a time slot of the first relay link, $t_2$ indicates a length of a time slot of the second relay link, and $t_3$ indicates a length of a time slot of a link between the first node and the MS.

14. The method of claim 13, wherein the relay information includes at least one of a pilot signal transmitted from each of the at least two nodes, Relay Channel Quality Indicator (RCQI) indicating relay channel qualities of nodes except for a last node when the MS and one among the at least two nodes are connected through two and more nodes, bandwidth allocation information provided when the at least two nodes use different bandwidths, and relay order information indicating a relay order of each of the at least two nodes.

15. The method of claim 13, wherein the step of receiving from the at least two nodes the relay information comprises:
   if a second node of the at least two nodes is a base station that is directly connected with the MS, receiving the relay information directly from the second node; and if the second node is a relay node that relays a signal of the MS, receiving the relay information including a channel quality information between an upper node and the second node from the second node.

16. The method of claim 15, further comprising, if a lower relay node of the second node exists, receiving from the lower relay node the relay information including the channel quality information.

17. A method for selecting a serving node by a Mobile Station (MS) to provide the MS with a service in a multi-hop wireless mobile communication system where a plurality of nodes exist, the method comprising the steps of:
receiving from at least two nodes relay information;
calculating an amount of data that can be transmitted per unit time of each of the at least two nodes using the relay information; and
selecting a node that can transmit a maximum amount of the data per the unit time as the serving node, based on the calculated amount of data, when the multi-hop wireless mobile communication system uses a fixed time slot,
wherein if the relay information includes relay order information and the MS is directly connected with a first node of the at least two nodes and the first node has a base station and a relay node as upper nodes, an amount of data per the unit time of the first node is calculated based on $$ETH_{cell1} = \min\left(\frac{BW_{relay2} \times Rate_{relay2} \times t_2}{relay\_order_{cell1}}, BW_{cell1} \times \log_2(1 + SINR_{cell1}) \times t_3\right)$$

where an Estimated data Throughput $(ETH)_{cell1}$ indicates the amount of data per the unit time of the first node, $BW_{cell1}$ indicates a bandwidth that is used by the first node, $BW_{relay2}$ indicates a bandwidth allocated to a relay link between the relay node and the first node, $SINR_{cell1}$ indicates a signal-to-interference noise ratio that is determined by measuring a strength of a pilot signal transmitted from the first node, $t_2$ indicates a length of a time slot of the relay link, $t_3$ indicates a length of a time slot of a link between the first node and the MS, $Rate_{relay2}$ indicates a transmission rate per unit bandwidth (bps/Hz) at which a signal can be transmitted through the relay link, and $relay\_order_{cell1}$ indicates a relay order of the first node.

18. A method for selecting a serving node in a multi-hop wireless mobile communication system where a base station, a Mobile Station (MS), and a relay node for relaying a signal of the MS exist, the method comprising the steps of
transmitting, by the base station, a pilot signal of the base station to the MS and the relay node;
measuring, by the relay node, a channel quality between the base station and the relay node using the pilot signal of the base station;
transmitting, by the relay node, a pilot signal of the relay node and information of the measured channel quality to the MS;
calculating an amount of data that can be transmitted per unit time of each of the base station and the relay node using at least one of the pilot signal of the base station, the pilot signal of the relay node and the information of the measured channel quality; and
selecting a node capable of transmitting and receiving a maximum amount of data per the unit time among the base station and the relay station as the serving node based on the calculated amount of data, when the multi-hop wireless mobile communication system uses a fixed time slot,
wherein if the MS is directly connected with the relay node and the relay node has the base station and a first node as upper nodes, an amount of data per the unit time of the relay node is calculated based on $$ETH_{cell1} = \min(BW_{relay1} \times Rate_{relay1} \times t_1, BW_{relay2} \times Rate_{relay2} \times t_2, BW_{cell1} \times \log_2(1 + SINR_{cell1}) \times t_3)$$

where an Estimated data Throughput $(ETH)_{cell1}$ indicates the amount of data per the unit time of the relay node, $BW_{cell1}$ indicates a bandwidth that is used by the relay node, $BW_{relay1}$ indicates a bandwidth allocated to a first relay link between the base station and the first node, $BW_{relay2}$ indicates a bandwidth allocated to a second relay link between the first node and the relay node, $Rate_{relay1}$ indicates a transmission rate per unit bandwidth (bps/Hz) at which data can be transmitted through the first relay link, $Rate_{relay2}$ indicates a transmission rate per unit bandwidth at which data can be transmitted through the second relay link, $SINR_{cell1}$ indicates a signal-to-interference noise ratio that is determined by measuring a strength of a pilot signal transmitted from the relay node, $t_1$ indicates a length of a time slot of the first relay link, $t_2$ indicates a length of a time slot of the second relay link, and $t_3$ indicates a length of a time slot of a link between the relay node and the MS.

19. The method of claim 18, wherein the base station transmits relay order information indicating it is a top node to the relay node.

20. The method of claim 19, wherein the relay order information is 0.

21. The method of claim 18, wherein the relay node transmits to the MS relay order information indicating it is positioned between the base station and the MS.

22. The method of claim 21, wherein the relay order information is 1.

23. The method of claim 18, wherein if the base station and the relay node use different bandwidths, the base station and the relay node broadcast bandwidth information of the base station and bandwidth information of the relay node to their respective lower nodes.

24. A method for selecting a serving node in a multi-hop wireless mobile communication system where a base station, a Mobile Station (MS), and a relay node for relaying a signal of the MS exist, the method comprising the steps of:
transmitting, by the base station, a pilot signal of the base station to the MS and the relay node;
measuring, by the relay node, a channel quality between the base station and the relay node using the pilot signal of the base station;
transmitting, by the relay node, a pilot signal of the relay node and information of the measured channel quality to the MS;
calculating an amount of data that can be transmitted per unit time of each of the base station and the relay node using at least one of the pilot signal of the base station, the pilot signal of the relay node and the information of the measured channel quality; and
selecting a node capable of transmitting and receiving a maximum amount of data per the unit time among the base station and the relay station as the serving node based on the calculated the amount of the data, when the multi-hop wireless mobile communication system uses a fixed time slot,
wherein if the base station transmits relay order information to the relay node and the MS is directly connected with the relay node and the relay node has the base station and a second node as upper nodes, an amount of the data per the unit time of the relay node is calculated based on $$ETH_{cell1} = \min\left(\frac{BW_{relay2} \times Rate_{relay2} \times t_2}{relay\_order_{cell1}}, BW_{cell1} \times \log_2(1 + SINR_{cell1}) \times t_3\right)$$

where an Estimated data Throughput (ETH)$_{cell1}$ indicates the amount of data per the unit time of the relay node, $BW_{cell1}$ indicates a bandwidth that is used by the relay node, $BW_{relay2}$ indicates a bandwidth allocated to a relay link between the second node and the relay node, $SINR_{cell1}$ indicates a signal-to-interference noise ratio that is determined by measuring a strength of a pilot signal transmitted from the relay node, $t_2$ indicates a length of a time slot of the relay link, $t_3$ indicates a length of a time slot of a link between the relay node and the MS, Rate$_{relay2}$ indicates a transmission rate per unit bandwidth (bps/Hz) at which a signal can be transmitted through the relay link, and relay_order$_{cell1}$ indicates a relay order of the relay node.

* * * * *